April 17, 1962

J. J. ROSENKRANZ 3,030,033

SHOWER HEAD

Filed Sept. 4, 1959

*INVENTOR.*
Jules J. Rosenkranz

BY Irving Seidman

ATTORNEY

April 17, 1962 J. J. ROSENKRANZ 3,030,033
SHOWER HEAD

Filed Sept. 4, 1959 2 Sheets-Sheet 2

INVENTOR.
Jules J. Rosenkranz
BY
*Irving Seidman*
ATTORNEY

000
United States Patent Office 3,030,033
Patented Apr. 17, 1962

3,030,033
SHOWER HEAD
Jules J. Rosenkranz, New York, N.Y., assignor to Lafayette Brass Manufacturing Company, Inc., a corporation of New York
Filed Sept. 4, 1959, Ser. No. 838,266
3 Claims. (Cl. 239—460)

This invention relates in general to shower heads.

Heretofore, shower heads in which the character of the desired spray was controlled by a handle means for effecting the adjustment of a flow obstructor relative to a discharge orifice, difficulty was encountered in maintaining the desired spray setting. This was because the pressure of the water acting against the flow obstructors would oftentimes cause the handle controlling the setting thereof to rotate thereby disturbing the obstructor out of adjusted position. For this reason such known shower heads required the bather to constantly adjust the handle to maintain the desired spray.

Also in such known shower heads there was no positive fluid or water shut off means located directly in the head of the shower. Thus, if for any reason the bather desired to turn off the water, the valve controlling the hot and cold water mains had to be simultaneously turned to the off position. Consequently, when the shower was turned on again, the bather would again have to adjust the main hot and cold water valves by a trial and error method in order to attain the desired water temperature he had before the shower was turned off. Such trial and error methods for re-establishing the desired temperature of water spray could be quite hazardous in that the hot water valve could be accidentally actuated in a manner which might result in scalding of the bather.

Therefore an object of this invention is to provide an improved shower head in which a positive shut off is provided directly in the head of the shower, thereby making it unnecessary to resort to the shut off valves of the main hot and cold lines feeding the shower head.

Another object is to provide in a shower head having means for reducing the fluid pressure acting upon the positive shut off means so as to prevent the fluid pressure from actuating the positive shut off means.

Another object is to provide a shower head having a positive means for maintaining the adjusted position of an established water spray.

Still another object is to provide a shower head with means for turning the spray on and off without requiring readjustment of the valves controlling the cold and hot water lines feeding the shower head.

The various features of novelty which characterize the invention are pointed out with particularity in the claims annexed to and forming a part of this specification. For better understanding of the invention, its operating advantages and specific objects attained by its use, reference should be had to the accompanying drawings and descriptive matter in which is illustrated and described a preferred embodiment of the invention.

Figure 1:
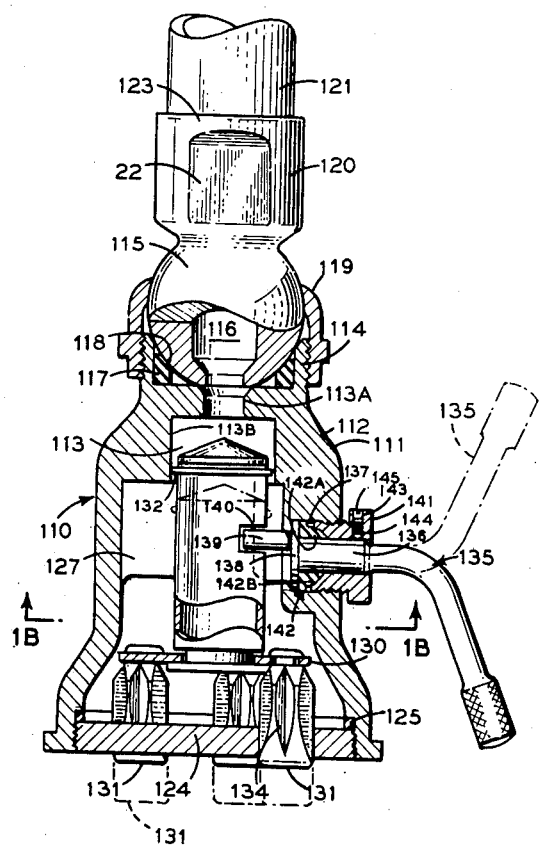
FIG. 1 is a sectional elevation view of a shower head made in accordance with this invention in which the solid lines indicate the inoperative position of its parts and the dash lines indicate the operative position of its parts.
Figure 1A:
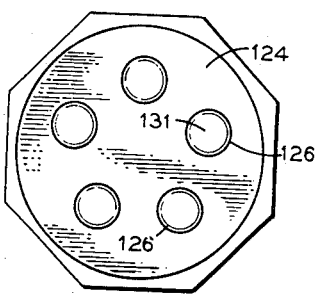
FIG. 1A is a bottom view of FIG. 1.
Figure 1B:
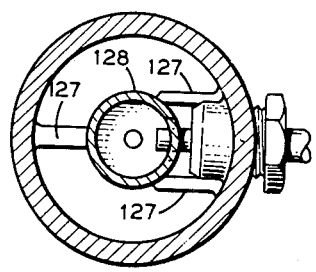
FIG. 1B is a sectional plan view taken along line 1B—1B of FIG. 1.
Figure 1C:
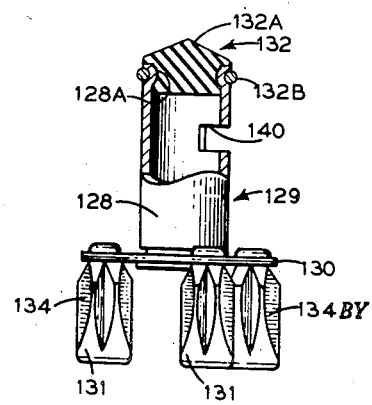
FIG. 1C is a detail view of the positive water shut off means and orifice obstructor assembly of FIG. 1.

Referring to FIGS. 1 to 1C, the improved shower head 110 in accordance with this invention comprises a hollow body member 111, generally bell shaped in form and having an inturned annular flange 112 at the small end thereof to define a fluid passageway 113. The fluid passageway 113 is provided with a fluid inlet 113A connecting with a fluid outlet 113B, the latter having a greater cross-sectional area than that of the fluid inlet 113A.

At its upper end the body 111 is provided with an externally threaded skirt or nipple 114 for receiving the ball connector 115 having a bore 116 extending therethrough to register with the fluid inlet 113A. A resilient washer 117 having a concave surface 118 forms a packing between the ball connector 115 and the body 111. A collar 119 secures the ball connector 115 to the body 111, the assembly described providing for universal movement for the shower head. The upper end of the ball connector 115 is provided with an internally threaded nipple 120 for receiving the water main pipe 121 supplying a mixture of hot and cold water to the shower head 110. As shown, the nipple 120 is provided with flats 122 to facilitate a wrench or other tool for turning the same to the main pipe 121. The flats 122 do not extend all the way to the upper periphery of the nipple. Therefore the periphery defining the upper edge portion of the nipple has a thickened portion of band 123 extending therearound for added strength.

The flared end of the bell shaped body member 111 is closed by a face plate 124, which is removably threaded to the body 111. A washer 125 is disposed between the face plate 124 and body 111 to provide a seal thereat. As shown in FIG. 1, the face plate 124 is provided with a plurality of discharge oriffices 126.

Integrally formed and extending radially inward of the body 111 are a plurality of ribs or projections 127 to form a guideway for a stem 128 of an internal assembly 129 as will be hereinafter described. The ribs 127 do not extend all the way to the center of the body, but extend only to a point tangent to the stem 128.

Control of the flow of water to the shower head and the character of spray discharging therefrom is attained by assembly 129.

As shown in FIGS. 1 and 1C the internal assembly 129 comprises the central hollow stem 128 which is arranged to reciprocate freely in the guideway formed by ribs 127. Connected to the lower end of the stem 128 is a carrier plate or spider 130 which carries thereon a plurality of flow obstructors 131 arranged to fall in axial alignment with the orifices 126 of the face plate 124. To facilitate assembly of the shower head, the spider 130 is connected to the stem 128 so as to permit relative rotation therebetween.

Connected to the upper end of the stem 128 is a resilient cap or member 132 which is frictionally secured to the stem by an inwardly extending bead 128A. As shown, the top 132A of the cap 132 converges to form an apex of a cone. Wtih this construction a greater surface area is exposed to the water pressure acting thereon. In this manner the pressure per unit area exerted against the top 132A of the stem 128 can be lessened. Thus, by reducing the pressure per unit area acting on the valve assembly 129, the tendency of the water pressure to disturb the handle setting is minimized.

As shown in FIG. 1, the stem is movable between operative and inoperative position. When in the inoperative position, as shown in FIG. 1, by the solid lines, the cap or upper end of the stem is extended into the enlarged outlet end 113A of the fluid passageway 113 to close the same. To enhance the seal between the stem and the walls of the fluid outlet 113A, a sealing O ring 132B of suitable resilient material, such as rubber or the like, is fitted around the periphery of the stem and is maintained in position thereon by the inherent elastic retention thereof in the outer convex surface by bead 128A. With the stem in the inoperative position, it will be apparent that the passageway is sealed, thereby preventing water from flowing through the shower head, although the water valves of the water mains, not shown, supplying the shower head, remain open at their desired hot and cold settings respectively.

In the operative position, as shown by the dash lines in FIG. 1, the upper end of the stem or cap is disposed outwardly of the passageway 113, thus permitting the water to flow therethrough to the orifices 126. At the same time the flow obstructors are readily adjustable to control the type of spray desired, as for example fine, coarse or any intermediate setting therebetween. The arrangement is such that the stem is moved free of the passageway 113 upon the initial movement of the handle means 135, with the remaining play of the handle means 135 allowing for varying the kind and degree of spray.

In order to control the area of the orifice opening and thereby the character of spray, each obstructor 131 is provided with a plurality of conventional diamond shape grooves 134.

Control for positioning the stem 128 and also the flow obstructors 131 comprises the handle means 135 which includes a shank 136 which extends through an opening 137 in the wall of the body member 111. Journaled at the inner end of the shank 136 is a disk 138 and to which a pin 139 is eccentrically connected. Opposite the pin 139 the stem 128 is provided with a horizontal slot 140 for receiving the pin 139. A closure means is provided to prevent leakage about the handle shank 136. This closure means comprises a plug 141 having a bore through which the shank 136 of the handle extends, the plug having threads for screwing the same in opening 137. A packing washer 142 is disposed between disk 138 and the plug 141 to form a fluid tight seal thereat.

As shown in FIG. 1, the washer 142 comprises a first portion 142A, which is snugly fitted to the diameter of the opening 137 in the body, and an integrally formed flaring portion 142B forming a frusto-conical surface which snugly fits a complementary surface of the plug. Thus as the plug 141 is threaded into opening 137 the washer 142 is compressed into a fluid tight seal.

With the arrangement described, the rotation of the handle means 134 effects a reciprocating movement of the stem 128 and connected obstructors 131. When the pin 139 reaches its high point of travel, as shown in the solid lines of FIG. 1, the valve member 132 is extended into the enlarged outlet 113A to close the fluid passageway 113. At a position intermediately beyond the high point of the pin, the fluid passageway 113 is opened, as indicated by the dash lines of FIG. 1.

To further resist any tendency of the handle means 135 to be rotated out of its adjusted position and thereby alter the character of spray, a loaded spring means is provided to impose a positive pressure on the shank 136 of the handle means. As shown in FIG. 1, the plug 141 is provided with a radially extending bore 143. A coil spring 144 is disposed into the bore to bear on the shank 136. To load the spring 144 a set screw 145 is threaded into the end of the bore 143. Thus by turning the set screw 145, the load acting on the spring 144 and transmitted to the shank 136 can be readily adjusted. In this manner the force of the spring 144 acting on the shank 136 can be readily adjusted to counteract the force of the water pressure at any given installation.

A novel aspect of this invention is the co-action of the enlarged fluid outlet 113B of passageway 113 with the increased surface area of the cap 132A exposed to the water pressure so as to reduce pressure per unit area acting on the valve stem assembly 129.

Figure 2:
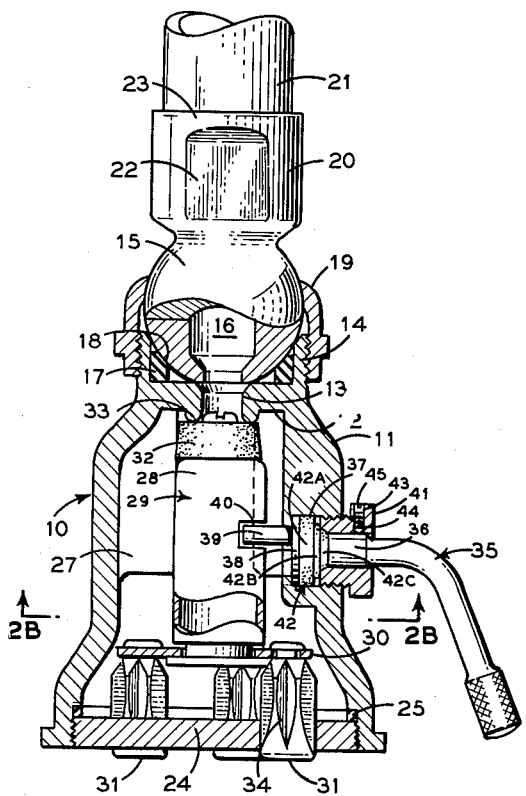
FIG. 2 is a showing of a modified shower head made in accordance with this invention having portions thereof shown in section.
Figure 2A:
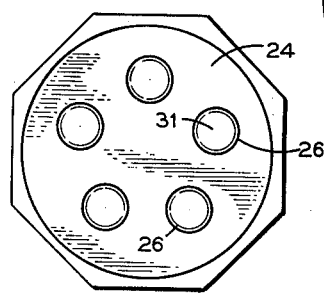
FIG. 2A is a bottom view of FIG. 2.
Figure 2B:
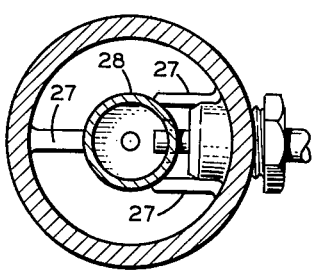
FIG. 2B is a sectional view taken along line 2B—2B of FIG. 2.
Figure 2C:
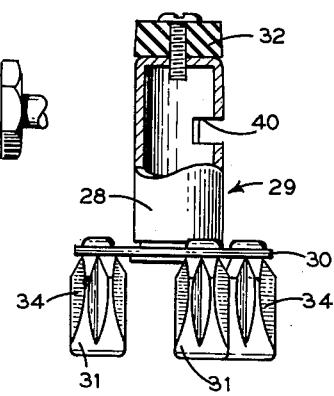
FIG. 2C is a detail view of the positive water shut off means and orifice obstructor assembly of FIG. 2.

FIGS. 2 to 2C illustrate a modified shower head 10. This embodiment comprises a hollow body member 11, also generally bell shaped in form and having an inturned annular flange 12 at the small end thereof to define a fluid inlet opening 13. Above the flange 12 the body is provided with an externally threaded skirt or nipple 14 for receiving the ball connector 15 having a bore 16 extending therethrough to register with the fluid inlet 13. A resilient washer 17 having a concave surface 18 forms a packing between the ball connector 15 and the body 11. A collar 19 secures the ball connector 15 to the body 11, the assembly described providing for universal movement for the shower head. The upper end of the ball connector 15 is provided with an internally threaded nipple 20 for receiving the water main pipe 21 supplying a mixture of hot and cold water to the shower head 10. As shown, the nipple 20 is provided with flats 22 to facilitate a wrench or other tool for turning the same to the main pipe 21. The flats 22 do not extend all the way to the upper periphery of the nipple. Therefore the periphery defining the upper edge portion of the nipple has a thickened portion or band 23 extending therearound for added strength.

The flared end of the bell shaped body member 11 is closed by a face plate 24 which is removably threaded to the body 11. A washer 25 is disposed between the face plate 24 and body 11 to provide a seal thereat. As shown in FIG. 2, the face plate 24 is provided with a plurality of discharge orifices 26.

Integrally formed and extending radially inward of the body 11 are plurality of ribs or projections 27 to form a guideway for a stem 28 of an internal assembly 29 as will be hereinafter described. The ribs 27 do not extend all the way to the center of the body, but extend only to a point tangent to the stem 28.

Control of the flow of water to the shower head and the character of spray discharging therefrom is attained by assembly 29.

As shown in FIGS. 2 and 2C, the internal assembly 29 comprises the central stem 28 which is arranged to reciprocate freely in the guideway formed by ribs 27. Connected to the lower end of the stem 28 is a carrier plate or spider 30 which carries thereon a plurality of flow obstructors 31, which are arranged to fall in axial alignment with the orifices 26 of the face plate 24. To facilitate assembly of the shower head, the spider 30 is connected to the stem 28 so as to permit relative rotation therebetween.

The upper end of the stem 28 has connected thereto a resilient member or washer 32 which functions as a valve to positively seal the fluid inlet 13. To enhance the seal therebetween the flange 12 defining the fluid inlet 13 is provided with a depending bead 33, which when in engagement with the valve washer 32 forms a line seal which is fluid tight as shown in FIG. 2, the arrangement is such that when the stem 28 and connected washer or valve 32 is in fluid closed position, the obstructors 31 are in the retracted position. Obviously as the stem 28 is moved downwardly, the fluid inlet 13 is opened and the flow obstructors 31 are free to then be adjusted axially in any desired setting. In order to control the area of the orifice opening and thereby the character of spray, each obstructor 31 is provided with a plurality of conventional diamond shape grooves 34.

Control for positioning the stem 28 and also the flow obstructors 31 comprises a handle means 35 which includes a shank 36 which extends through an opening 37 in the wall of the body member 11. Journaled at the inner end of the shank 36 is a disk 38 and to which a pin 39 is eccentrically connected. Opposite the pin 39 the stem 28 is provided with a horizontal slot 40 for receiving the pin 39. A packing means is provided to prevent leakage about the handle shank 36. This packing means comprises a plug 41 having a bore through which the shank 36 of the handle extends the plug having threads for screwing the same in opening 37'. A washer 42 is disposed between disk 38 and the plug 41 to form a fluid tight seal thereat.

As shown in FIG. 2, the washer 42 comprises a first portion 42A which is snugly fitted to the diameter of the opening 37 in the body, an integrally formed bead shaped portion 42B having a smaller diameter, and a third portion 42C having a frusto-conical surface which snugly fits a complementary surface of the plug. Thus as the plug 41 is threaded into opening 37 the washer 42 is compressed into a fluid tight seal.

With the arrangement described, the rotation of the handle means 34 effects a reciprocating movement of the stem 28 and connected obstructors 31. When the pin 39 reaches its high point of travel the valve member 32 is brought flush against the valve seat 33 and closes the fluid inlet 13. At a position intermediate the high point of the pin, as viewed in FIG. 1, and its low point will cause the fluid inlet 13 to be open.

To resist any tendency of the handle means 35 to be rotated out of its adjusted position and thereby alter the character of spray, a loaded spring means is provided to impose a positive pressure on the shank 36 of the handle means. As shown in FIG. 2, the plug 41 is provided with a radially extending bore 43. A coil spring 44 is disposed into the bore to bear on the shank 36. To load the spring 44 a set screw 45 is threaded into the end of the bore 43. Thus by turning the set screw 45, the load acting on the spring 44 and transmitted to the shank 36 can be readily adjusted. In this manner the force of the spring 44 acting on the shank 36 can be readily adjusted to counteract the force of the water pressure at any given installation.

Figure 3:
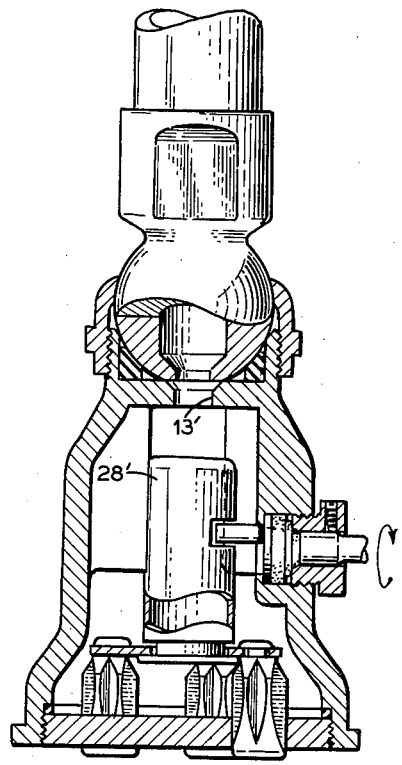
FIG. 3 is still another modified embodiment of the invention.

The embodiment of FIG. 3 differs from that of FIG. 2 as described only in that the stem 28' is not shown with a valve mans for closing the fluid inlet 13'. Also this form does not show the particular valve seat of FIGS. 1 and 2.

From the foregoing description it will be apparent that the shower head 10 of this invention is relatively inexpensive, easily produced, as it can be made up in the most part from standardized components, and positive in operation. Thus with little if any increase in cost, three significant improvements and novel features are included in what is otherwise considered to be a conventional shower head. These are (1) a positive shut off feature at the head whereby the shower spray may be positively shut off and re-established at the same water temperature, (2) means for decreasing the water pressure per unit area acting on the shut off means and connected flow obstructors and (3) means for exerting a positive force on the handle means, preferably greater than that of the water pressure acting thereon to positively resist rotation.

While in accordance with the provisions of the statutes there is illustrated and described herein the best form and mode of operation of the invention now known to the inventor, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. A shower head adapted to receive a mixture of hot and cold water comprising a hollow body having a fluid inlet in one end for receiving the mixture and an opening at the other end, a valve seat surrounding said inlet, a face plate having a plurality of orifices extending across said opening, said face plate being detachably connected to said body, a flow obstructor in axial alignment with each of said orifices, means connecting said obstructors for simultaneous movement toward and away from their respective orifices for adjusting the character of spray, said connecting means including a stem slidably mounted within said body, a resilient valve member connected to the upper end of said stem adapted to be received in said valve seat for positively closing said fluid inlet tight, inwardly extending fins connected to said body to provide a guideway for said stem, a spider connected to said stem, said obstructors being connected to said spider, handle means having a shank extending laterally through a wall portion of said body, a disk journaled at the inner end of said shank, a crank pin eccentrically connected to said disk, said stem having a transversely extending slot for receiving said pin so that rotation of said handle means transmits a simultaneous reciprocating sliding movement to said stem and connected obstructors whereby actuation of said handle interrupts and re-establishes at will at the shower head the flow of water through said shower head without affecting the ratio of cold to hot water of said mixture, and positive locking means acting on said handle for resisting the tendency of said handle means to rotate out of adjusted position due to fluid pressure, said latter means including a loaded spring acting on the shank of said handle means and a set screw for adjusting the force with which said spring is loaded for counteracting the fluid pressure tending to rotate said handle means.

2. A shower head adapted to receive a mixture of hot and cold water comprising a hollow body having a fluid inlet in one end for receiving the mixture and an opening at the other end thereof, coupling means forming a ball and socket universal connection adjacent said fluid inlet, said coupling means including an externally threaded skirt, a ball shaped nipple having a bore extending therethrough, said bore being adapted to register with said fluid inlet, and a collar securing the nipple to said skirt, a valve seat surrounding said fluid inlet, a face plate having a plurality of orifices extending across said opening, said face plate being detachably connected to said body, a flow obstructor in axial alignment with each of said orifices, said flow obstructor having an area greater than that of said fluid inlet means connecting said obstructors for simultaneous movement toward and away from their respective orifices for adjusting the character of spray, said connecting means including a stem slidably mounted within said body, a resilient valve member connected to the upper end of said stem adapted for being received in said valve seat for positively closing said fluid inlet fluid tight, inwardly extending fins formed integral within said body to provide a guideway for said stem, a spider connected to said stem, said obstructors being connected to said spider, a handle means having a shank extending laterally through a wall portion of said body, a disk journaled at the inner end of said shank, a crank pin eccentrically connected to said disk, said stem having a transversely extending slot for receiving said pin so that rotation of said handle means transmits a reciprocating sliding movement to said stem and connected obstructors whereby actuation of said handle interrupts and re-establishes at will at the shower head the flow of water through said shower head without affecting the ratio of cold to hot water of said mixture, and means acting on said handle for resisting the tendency of said handle means to rotate out of adjusted position due to fluid pressure action thereon, said last mentioned means including a loaded spring acting on the shank of said handle means and a set screw for adjusting the force with which said spring is loaded for counteracting the fluid pressure tending to rotate said handle means.

3. A shower head adapted to receive a mixture of cold and hot water comprising a hollow body, means forming a fluid passageway in one end of said body, said passageway having a fluid inlet and fluid outlet, said fluid outlet having a greater cross-section area than the fluid inlet, a face plate having a plurality of discharge orifices therein extended across the other end of said body, a flow obstructor in axial alignment with each of said orifices, mounting means for simultaneously reciprocating said flow obstructors toward and away from their respective orifices for varying the character of fluid spray discharging therefrom, said mounting means including a stem slidably disposed within said body for reciprocal movement between operative and inoperative position, the upper end of said stem having a cross-sectional area substantially equal to that of said fluid outlet, said stem adapted to be moved into said fluid outlet to seal the same in the inoperative position thereof and moved out of said outlet in the operative position thereof, and handle means extending through said body and connecting to said stem whereby actuation of said handle means reciprocates said stem between operative and inoperative position for either interrupting or reestablishing at will the flow of water therethrough at the shower head without affecting the ratio of cold to hot water of the mixture, said stem including a resilient sealing ring extending about the outer periphery of said stem, said sealing ring engaging the walls of said outlet to form a fluid tight seal thereat in the inoperative position, a spring for loading said handle means to resist rotation of said handle means due to fluid pressure acting thereon, and a set screw for adjusting the loading of said spring for varying the force required to counteract the fluid pressure acting on said handle means.

References Cited in the file of this patent

UNITED STATES PATENTS

| | | |
|---|---|---|
| 904,134 | Kilbourn | Nov. 17, 1908 |
| 904,673 | Bideker | Nov. 24, 1908 |
| 1,994,389 | Brisco | Mar. 12, 1935 |
| 2,000,792 | Schmiedeknecht | May 7, 1935 |
| 2,448,792 | Fraser | Sept. 7, 1948 |
| 2,523,084 | Adragna | Sept. 19, 1950 |
| 2,789,013 | Bletcher et al. | Apr. 16, 1957 |
| 2,790,677 | Filliung | Apr. 30, 1957 |
| 2,806,741 | Fishelson | Sept. 17, 1957 |
| 2,938,673 | Allenbaugh | May 31, 1960 |
| 2,955,766 | Nielsen | Oct. 11, 1960 |

FOREIGN PATENTS

| | | |
|---|---|---|
| 28,148 | Great Britain | June 1, 1911 |
| 501,078 | France | Jan. 16, 1920 |